United States Patent
Elam et al.

(10) Patent No.: US 8,498,920 B2
(45) Date of Patent: Jul. 30, 2013

(54) METHOD AND SYSTEM FOR EXCHANGING ENVIRONMENTAL SAVINGS ACQUIRED BY USE OF ALTERNATIVE FUELS

(75) Inventors: Rob Elam, Seattle, WA (US); Michael Kudriavtseff, Seattle, WA (US)

(73) Assignee: Propel Biofuels, Inc., Seattle, WA (US)

( * ) Notice: Subject to any disclaimer, the term of this patent is extended or adjusted under 35 U.S.C. 154(b) by 1214 days.

(21) Appl. No.: 12/043,074

(22) Filed: Mar. 5, 2008

(65) Prior Publication Data

US 2009/0228404 A1 Sep. 10, 2009

(51) Int. Cl.
*G06Q 40/00* (2012.01)
*G06F 17/00* (2006.01)

(52) U.S. Cl.
USPC ...... 705/37; 705/14.1; 705/14.11; 705/14.19; 705/14.34; 705/35; 705/413

(58) Field of Classification Search
USPC ........... 705/35, 37, 14.1, 14.11, 14.19, 14.34, 705/413
See application file for complete search history.

(56) References Cited

U.S. PATENT DOCUMENTS

| | | | | |
|---|---|---|---|---|
| 7,343,341 | B2 * | 3/2008 | Sandor et al. | 705/37 |
| 7,497,191 | B2 | 3/2009 | Fulton et al. | |
| 2004/0210478 | A1 * | 10/2004 | Pettigrew et al. | 705/14 |
| 2004/0230443 | A1 * | 11/2004 | McMorris et al. | 705/1 |
| 2005/0027592 | A1 * | 2/2005 | Pettigrew et al. | 705/14 |
| 2007/0135988 | A1 * | 6/2007 | Kidston et al. | 701/102 |
| 2007/0265897 | A1 * | 11/2007 | McMorris et al. | 705/7 |
| 2007/0294102 | A1 * | 12/2007 | McMorris et al. | 705/1 |
| 2008/0154671 | A1 * | 6/2008 | Delk | 705/7 |
| 2008/0228628 | A1 * | 9/2008 | Gotthelf et al. | 705/37 |
| 2008/0249965 | A1 * | 10/2008 | Pollack et al. | 705/413 |
| 2009/0005903 | A1 * | 1/2009 | Winsness | 700/239 |
| 2009/0055304 | A1 * | 2/2009 | Lange | 705/37 |
| 2009/0177548 | A1 * | 7/2009 | Eisenlohr | 705/14 |
| 2009/0187416 | A1 | 7/2009 | Baer et al. | |
| 2009/0201293 | A1 | 8/2009 | Tung et al. | |
| 2009/0228403 | A1 | 9/2009 | Elam et al. | |

FOREIGN PATENT DOCUMENTS

WO WO 2007095742 A1 * 8/2007

OTHER PUBLICATIONS

Terry Slavin, "Cash: Property: Don't crank the heating up, darling—we need the carbon for our holiday: Terry Slavin looks forward to the day when every single one of us will have to do our bit for the planet—by budgeting for our emissions", Dec. 10, 2006, The Observer, p. 20.*

"An Inconvenient Truth: Calculate Your Impact," http://www.climatecrisis.net/takeaction/carboncalculator/, accessed on Jul. 1, 2008, 2 pages.

(Continued)

*Primary Examiner* — Kenneth Bartley
(74) *Attorney, Agent, or Firm* — Perkins Coie LLP

(57) ABSTRACT

A method and system to report the environmental benefits of consumers' purchases of alternative fuels. The system tracks and stores the purchases of customers from a vendor of alternative fuels. The system calculates the environmental savings that a customer generates by using alternative fuel in place of standard fuels. Environmental savings may be calculated in terms of various metrics, including reduced carbon emissions, gasoline not consumed, or other environmental benefits. The system provides a marketplace that allows consumers to receive the benefit of the calculated environmental savings by selling, trading, or retiring the generated savings.

19 Claims, 7 Drawing Sheets

OTHER PUBLICATIONS

"Carbon Calculator: Welcome to the Cool California.org carbon footprint calculator!" http://www.coolcalifornia.org/calculator,html, accessed on Jul. 1, 2008, 4 pages.

"Carbon Footprint Calculator: TerraPass—Calculate your Carbon Emissions from Driving a Car, Air Travel & Home Energy Use," http://www.terrapass.com/carbon-footprint-calculator/, accessed on Jul. 1, 2008, 2 pages.

"Individual Emissions—Personal Emissions Calculator," http://www.epa.gov/climatechange/emissions/ind_calculator.html, accessed on Jul. 1, 2008, 6 pages.

"New GHG-Emissions Measurement Tool to Democratize Carbon Footprinting," http://www.greenbiz.com/news/2007/12/12/new-ghg-emissions-measurement-tool-democratize-carbon-footprinting, accessed on Jul. 1, 2008, 2 pages.

* cited by examiner

METHOD AND SYSTEM FOR EXCHANGING ENVIRONMENTAL SAVINGS ACQUIRED BY USE OF ALTERNATIVE FUELS

BACKGROUND

In recent years, environmental issues have become an increasing concern for government and for citizens. Some pollutants, such as sulfur dioxide, have been a concern for many years. More recently, pollutants that contribute to global warming, such as carbon dioxide, have grown in prominence as well. Since a significant portion of the carbon dioxide generated each year is produced by vehicles powered by gasoline or diesel fuels, there has been an increase in interest in using alternative fuels to reduce these emissions. Alternative fuels include biodiesel, which is produced from plant oils (most commonly soybean oil). Alternative fuels also include ethanol, hydrogen, natural gas, and biobutenol. Electricity can also be considered an alternative fuel when used in an electric car.

Although many consumers want to help against global warming, average consumers may not know what to do to reduce carbon dioxide emissions. Often, they will have trouble determining what practices are most effective. In recent years services have arisen that allow consumers to help offset their impact on the environment. The most well-known are organizations that allow consumers to make themselves "carbon-neutral" by, for example, paying an organization to plant trees sufficient to offset the carbon they produce. Another common mechanism is for an organization to invest the offset money in activities that are environmentally friendly, such as clean power generation. Still, it is hard for consumers to find ways to directly understand the impact of their efforts. Even purchasers of environmentally friendly cars would benefit from knowing how useful their efforts are. Therefore, it would be useful to have a way for consumers to track and take advantage of the benefits they are providing by using environmentally friendly technologies.

DETAILED DESCRIPTION

Figure 1:
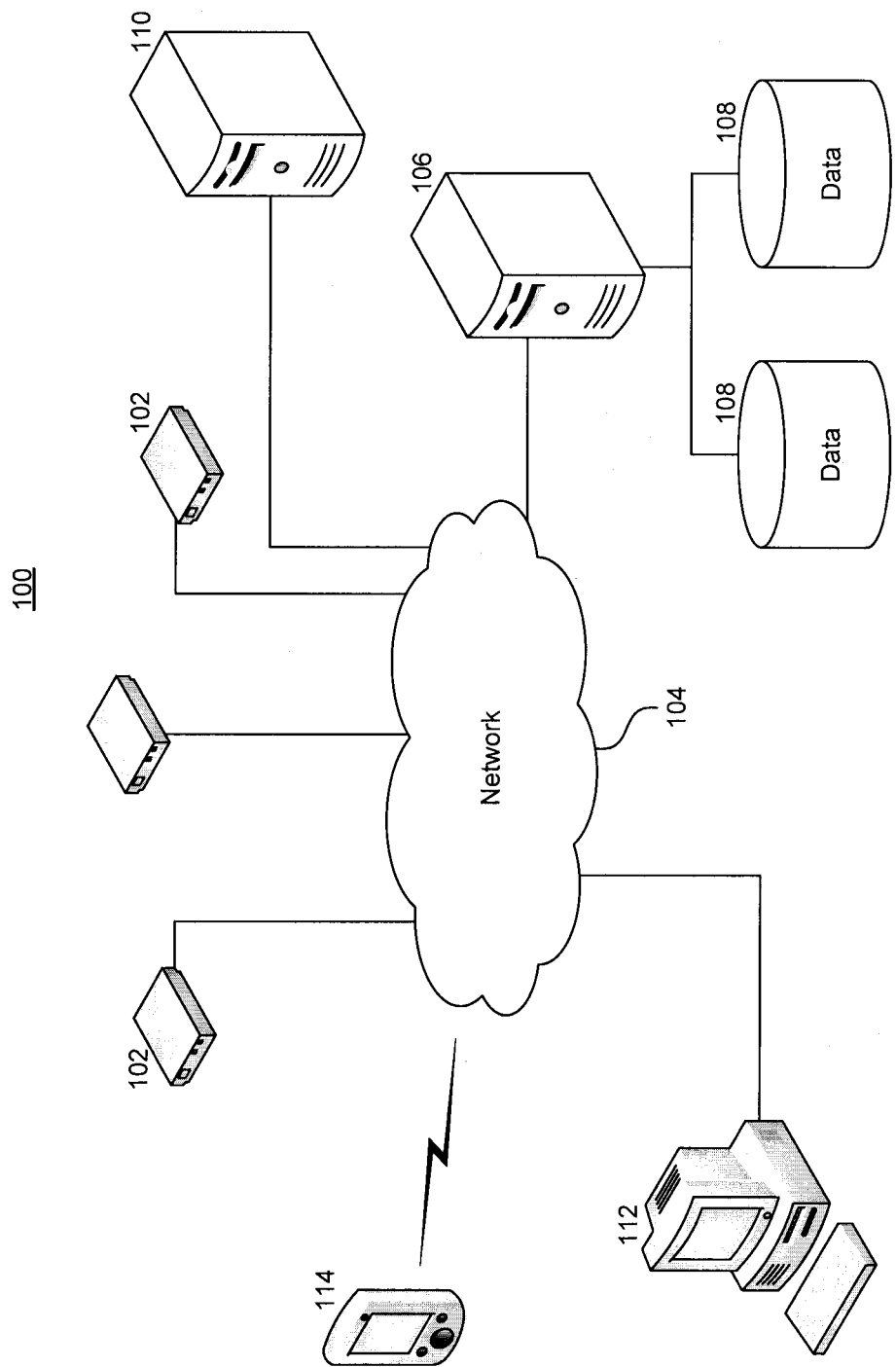
FIG. 1 is a block diagram of a representative environment in which an environmental savings exchange and reporting system operates.

A method and system to report the environmental benefits of consumers' purchases of alternative fuels and to reward consumers for generating those benefits by allowing the generated environmental savings to be exchanged is disclosed (hereinafter referred to as the "environmental savings exchange and reporting system" or "system").

The environmental savings exchange and reporting system tracks and stores the purchases of customers from a vendor of alternative fuels. For each customer, the system calculates the environmental savings that the customer generated by using alternative fuel in place of standard gasoline or petro-diesel. Environmental savings may be calculated in terms of reduced carbon emissions, gasoline not consumed, or other environmental benefits. The system generates a report for each customer that details the amount of the environmental savings, and allows the customer to access the report via a website, a fueling terminal, in hard copy, or other presentation form. By providing meaningful information to a customer about the benefits of using alternative fuel as compared to traditional fuel, customers can make more informed choices about the type and amount of fuel to consume.

In some embodiments, the system aggregates the savings of two or more customers that fall within a defined community and generates reports based on the aggregate community consumption. A community could be defined in many ways, including geographically or by affinity. The system is thereby able to show the benefits generated by a community in the consumption of alternative fuel as compared with traditional fuels.

The environmental savings exchange and reporting system provides a tracking function and an exchange function. The tracking function lets customers track the environmental benefits of their alternative fuel purchases. To use the tracking function, the system generates reports for the user based on the collected information. The reports are designed to show the customer the environmental benefits of the customer's alternative fuel use. For example, the system may show the customer the amount of carbon saved by using alternative fuels in place of standard gasoline or petro-diesel. The system could also show other metrics, such as the equivalent number of trees that would be needed to produce the same savings. The system could show the benefits resulting from individual purchases or the accumulated benefits over a period of time (such as the previous year). In addition, as an alternative to showing information by individual, the system might also show the benefits generated by a community. The community used could be defined in many ways, including geographically, by affinity, or by workplace.

In some embodiments, the environmental savings exchange and reporting system provides a marketplace that allows consumers to receive the benefit of calculated environmental savings by selling, trading, or retiring the generated offset. For example, the system might have the environmental savings verified by a third party organization as environmental offsets. Each customer's offset could therefore be redeemed directly for the value of the verified offset. Alternatively, the system may provide the customer the option to retire the offset rather than exchange it. Retiring the offset increases the cost of other offsets, which creates a greater incentive for others to reduce emissions. As another alternative, the system might allow offset credits to be applied towards the purchase of other companies' products or services. One benefit of this option is that many companies would be willing to provide goods/services in exchange for the chance to develop a relationship with the customer. Therefore, the customer might be able to exchange the accumulated offset for goods at a rate greater than what the customer could otherwise get for just selling the offset.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram of an environment 100 in which an environmental savings exchange and reporting system operates. A plurality of data collectors 102 are connected to a network 104. The data collectors are located at places selling the alternative fuels tracked by the system. These selling places include self-owned fueling stations, facilities co-located with traditional fueling stations, or non-traditional stations such as convenience stores. Each data collector collects information about fueling transactions, including the amount of fuel purchased and the credit card number or other uniquely identifiable code associated with the purchaser.

The various elements of the system are connected through a network 104. The network 104 may be any type of public or private connection suitable for transporting data between nodes. In some embodiments, the Internet is used to provide the connection, but other connections may also be used. For example, the systems could be connected through a dialup phone line, a dedicated line, or a terrestrial or satellite wireless network.

When a customer makes a purchase, the data collector 102 first handles the point of sale transaction. In some embodiments, these transactions are conducted by credit or debit card. The data collector 102 communicates the credit or debit card information to a remote location for processing. For example, a credit or debit card processor 110, typically operated by a third party, may be configured to handle credit or debit card transactions. Alternatively, the customer may pay with cash or other method not requiring remote processing. When the customer pays in cash or other method not requiring remote processing, the data collector may allow the customer to enter a unique customer identifier so that the purchase may be tracked by the system in accordance with the techniques described herein. For example, each registered customer may have an identification card that can be swiped at the time of purchase or a user code that they enter at the time of purchase. To facilitate tracking, a user may be required to enter a user code at the time of purchase regardless of the payment method.

After the purchase is complete, the transaction information associated with the purchase is transmitted to a server 106. The transaction information may be sent from the data collector 102 to the server as a single message that includes both the amount of fuel purchased and the customer identification information. Alternatively, transaction information associated with several purchases may be aggregated at the data collector 102 and periodically transmitted to the system (e.g., hourly, daily). In some embodiments, the transaction information may be derived from other or multiple sources. For example, the server 106 might retrieve transaction information from the credit card processor 110. Alternatively, some data may be received from the data collector 102 while other data is received from the credit card processor. In the latter case, the server 106 correlates the data from different sources to generate the transaction information, for example by matching transaction times.

After the server 106 has received transaction information, it stores the transaction information in a data storage area 108. In some embodiments, the data for each transaction is indexed in the data storage area according to the customer making the purchase. In some embodiments, the server 106 looks up the registered customer according to the credit or debit card used to make the purchase. In some embodiments, the server 106 uses alternate methods to determine what customer made the purchase. For example, the system may associate the transaction information with a customer based on an identification card that was swiped at the time of purchase or by a unique customer code that was entered at the time of purchase. Because customers may vary the way that they pay for purchases of fuel, the system must associate multiple payment types to a single customer in order to more accurately track the purchases of that customer.

After the data has been stored, the environmental savings exchange and reporting system uses the stored information to calculate environmental savings that the customer achieved using alternative fuels over traditional fuels. The system then generates one or more reports that customers may use to retrieve information about their activities. In some embodiments, the system makes the reports available to customers via a website. The customer may then access the website using a personal computer 112 or a mobile device 114. Alternatively, the customer might use a network-connected application installed on the personal computer 112 or mobile device 114 to access the system. The customer may also access the reports through other means, such as at a fueling terminal or through a hard copy provided by the system. The details of the reports will be discussed below.

Figure 2:
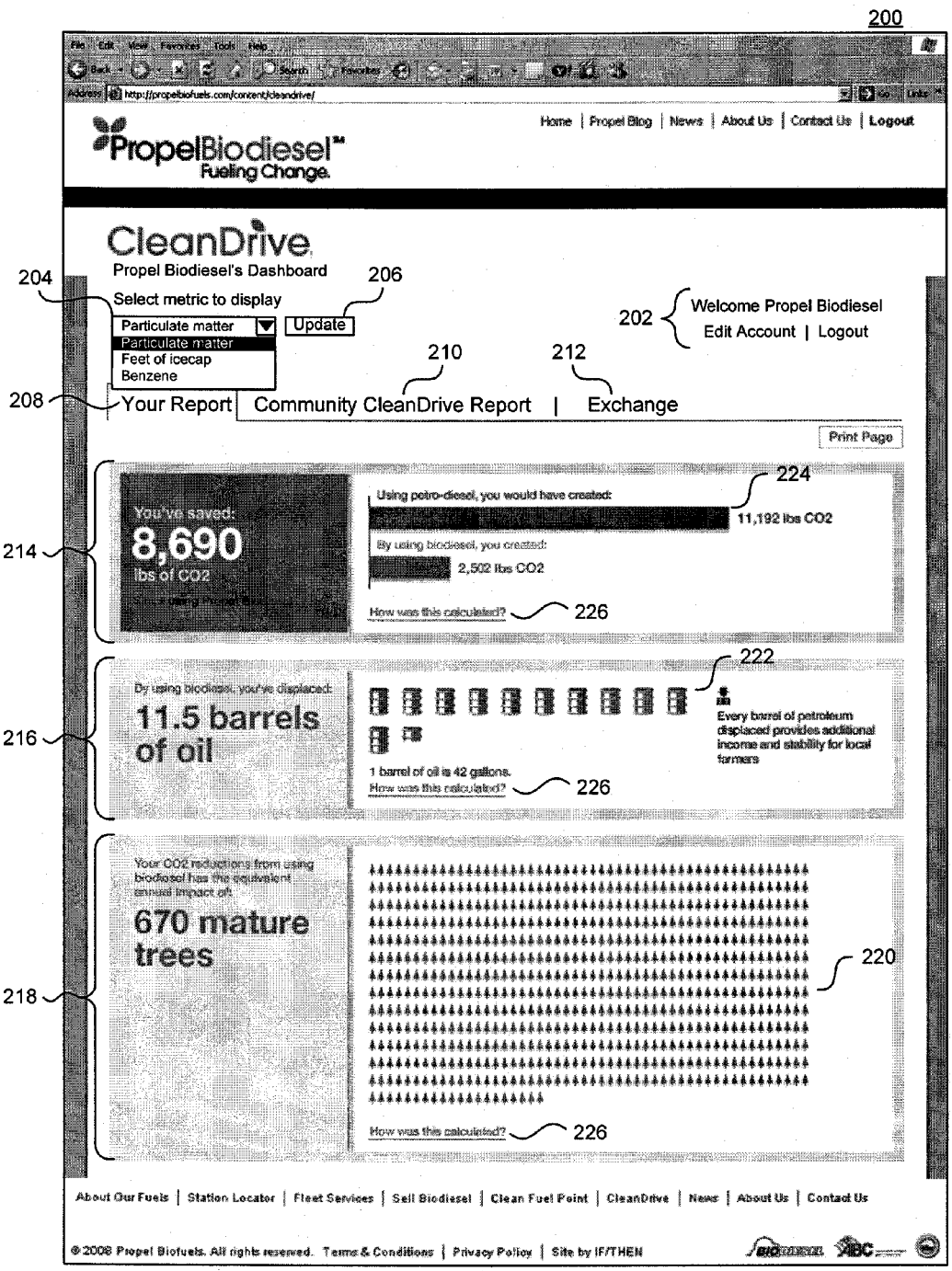
FIG. 2 is a representative interface for reporting environmental savings.

FIG. 2 is a representative interface 200 that is generated by the system for reporting environmental savings. The interface includes an account section 202 that identifies the current customer and allows the customer to edit details in his/her account (e.g., email address, number of and type of vehicles, etc.) or to log off. In some embodiments, the interface also includes multiple tabs allowing the customer to navigate the various reports and functions provided by the system. For example, the interface 200 allows the customer to view an individual report by selecting a "Your Report" tab 208 or a community report by selecting a "Community CleanDrive Report" tab 210. The interface 200 also allows the customer to select an "Exchange" tab 212, which provides a link to the exchange functionality discussed in further detail herein.

The system uses interface 200 to report environmental savings that the customer has generated as a result of consumption of alternative fuels over traditional fuels. The environmental savings are converted into a numerical or graphical representation of the savings using one or more metrics that may be readily interpreted by the customer. In the example interface shown in FIG. 2, three different metrics are used to show the cumulative environmental savings achieved by the customer. A first region 214 depicts the environmental savings as a reduction in carbon dioxide emissions that resulted from using alternative fuels instead of its primary substitute. Thus, the first region includes a graphical bar 224 representing the amount of carbon dioxide generated by an equivalent amount of petro-diesel as compared with a graphical bar 226 representing the amount of carbon dioxide generated by the use of biodiesel. Similarly, in a second region 216 the interface depicts the environmental savings as a reduction in the number of barrels of oil saved by using alternative fuels. For emphasis, in addition to displaying the number of barrels that are displaced ("11.5 barrels of oil"), the interface also presents graphic elements 222 that visually depicts the number of barrels. In a third region 218, the interface depicts the environmental savings as the number of mature trees that it would take to have an equivalent impact. The number of mature trees is also represented by graphic elements 220. The use of graphical elements to supplement the numerical display provides added emphasis when showing the environmental savings, particularly as the savings increases over time. For each metric that is used, the system also provides a link 226 to an explanation of how the savings calculation was performed. The specifics of the conversion calculation are discussed below. Although the interface in FIG. 2 shows the benefits accumulated since registering with the system, the system could also be configured to show alternate views such as savings in a particular time period (e.g., savings in the last month, savings in the previous year, savings since vehicle purchase), savings from a particular purchase of fuel, or savings from purchases made at a specific location.

The interface also provides a means for the customer to select other metrics to show in the report. The interface includes a drop-down box 204 listing other metrics that the customer may select. For example, the customer may opt to display reductions in particulate matter emissions, feet of icecap saved, or reduction in benzene emissions. The system could also display other metrics, such as reductions in emissions of other greenhouse gases. A list of known greenhouse gases could be drawn from sources such as the reports of the Intergovernmental Panel on Climate Change. To add a new metric to the report, the customer selects the desired metric from the drop-down box 204 and selects the button 206 to update the page. Of course, the system might also display other metrics for which the conversion data is available. To remove a metric from the report, a delete button (not shown) may be added to each region to allow the customer to remove selected representations.

Figure 3:
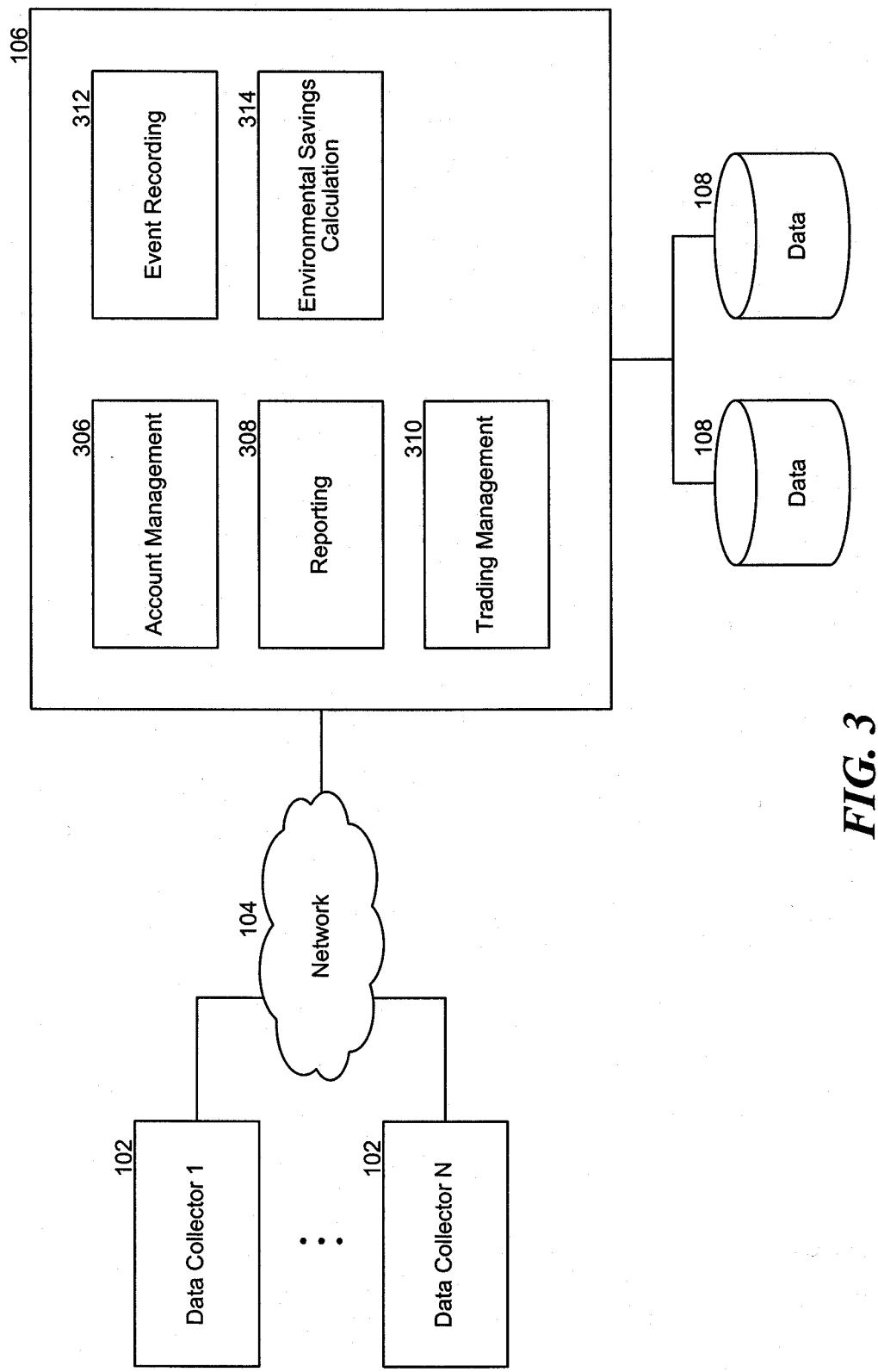
FIG. 3 is a block diagram of the environmental savings exchange and reporting system.

FIG. 3 is a block diagram of the environmental savings exchange and reporting system 100. The system includes a set of N data collectors 102 connected to a server 106. The data collectors 102 are located at the fueling stations. The data collectors transmit data to the main server through network 104. Although data collectors 102 are shown separately, in some embodiments data collection will be aggregated from two or more data collectors before transmission to the server 106.

The server 106 interfaces with a data storage area 108 to store data received from the data collectors 102. The data storage area could utilize any commercial off-the-shelf database or data management product, including MySQL, Microsoft SQL Server, or Oracle.

As will be described in additional detail herein, the server 106 includes a number of modules to facilitate the reporting and exchange functions of the system. Although the various modules are depicted in a single server, the modules are not necessarily physically co-located. In some embodiments, the various modules could be distributed over multiple physical devices and the functionality implemented by the modules may be provided by calls to remote services. Moreover, multiple servers may be used to implement the functionality described herein. Similarly, the data storage area could be local storage or remote storage, and distributed in one or more physical devices. The code to support the functionality of this system may be stored on a computer-readable medium such as an optical drive, flash memory, or a hard drive.

The server 106 includes an account management module 306 to handle account setup and management. A new customer may be required to register and create an account with the system to use its features. When registering, the new customer creates a username and password for the system and provides other account information, such as a credit card to allow the system to link purchases to the account. The customer may also provide the make and model of a vehicle or vehicles that will be tracked by the system. The account management module 306 receives the customer information and stores it in the data storage area 108. The account management module 306 provides other functionality relating to customer accounts, including enabling the customer to log on and modify settings. An event recording module 312 receives transaction information associated with a customer and stores the data for subsequent manipulation and display. An environmental savings calculation module 314 utilizes the stored transaction information to calculate the environmental savings achieved by using alternative fuels over traditional fuels. A reporting module 308 formats and displays the calculated environmental savings information for display to the customer. And a trading management module 310 allows customers to exchange or retire environmental savings. The operation of each of these server modules will be described in additional detail below with reference to FIGS. 4A, 4B, and 6. The server 106 may have other standard modules that are not shown. For example, certain communication and web interface modules may be present but are not depicted for purposes of clarity.

Figure 4A:
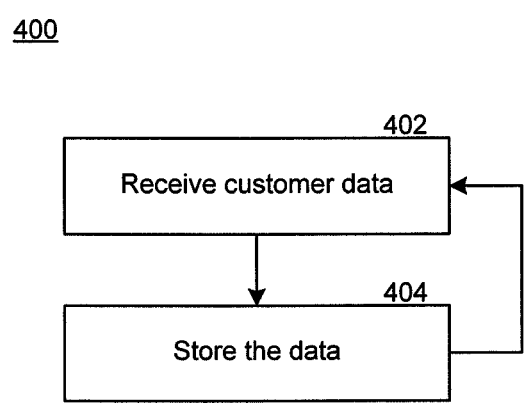
FIGS. 4A and 4B are flow charts of a process implemented by the system for tracking environmental savings.

FIG. 4A is a flow chart of a process 400 implemented by the system for collecting data to track environmental savings. At block 402, the event recording module 312 receives transaction information from the data collectors 102 or from third party services, such as credit and debit card processors 110. In some embodiments, the data collectors 102 transmit transaction information to the event recording module immediately when a transaction completes. Alternatively, the event recording module may collect data from the data collectors or from third party services at regular intervals, such as nightly. The transport mechanism may vary depending on the frequency that the transaction information is transported. For example, when information is provided immediately, the data collectors may use a push mechanism to transmit the information. On the other hand, if information is received at fixed intervals, the event recording module may initiate the transfer by issuing commands or calls to the data collectors. In some embodiments, the data might be stored by the credit card processor for retrieval by the event recording module. The system may also use a hybrid implementation, where some data is sent immediately while other data is retrieved at set intervals. For example, the event recording module may retrieve data from the credit card processor once a day but receive the rest of the transaction information immediately.

The event recording module 312 receives transaction information including the amount of fuel purchased and the identity of the customer making the purchase. The identity of the customer may be derived from a variety of pieces of information. For example, the identity of the customer may be derived from the credit card used in the purchase (either correlated at the server or correlated by a credit card processor). For non-credit card transactions, the identity of the customer may be derived from a unique identification code entered by the customer or by information derived, for example, from a customer's check. The transaction information may also include other information provided at transaction time. For example, if a customer has more than one car registered to the account, during fueling the system may prompt the customer to select which car is being refueled. Alternatively, the customer may be allowed to log-on to the system after fueling and associate certain vehicles with different fueling events.

At block 404 of FIG. 4A, the event recording module 312 stores the transaction information in the data storage area. In some embodiments, the module stores the amount of fuel purchased by a customer and the date of each purchase. It may also store any associated information, such as the car that the customer linked to the purchase.

Figure 4B:
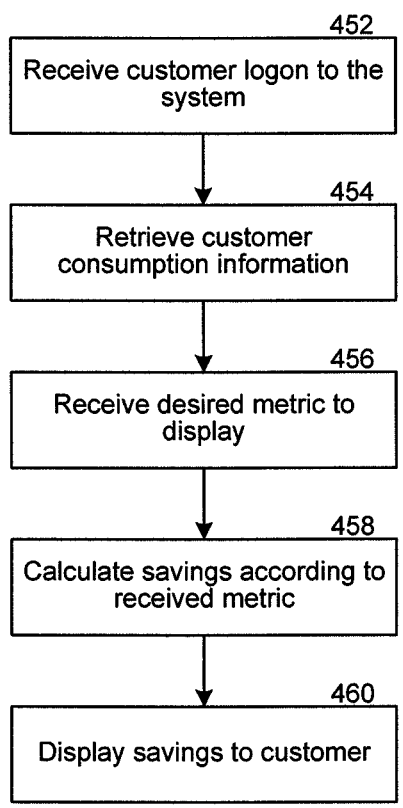

FIG. 4B is a flow chart of a process 450 implemented by the system for reporting data on environmental savings. At block 452, the system receives a customer's logon information. The logon may be implemented using any means known in the art, such as by username and password, or by security token. After the correct customer logon is received, the system proceeds to block 454, where the reporting module 308 retrieves the customer's consumption information from the data storage area 108. Consumption information includes the amount of alternative fuels the customer has purchased. The consumption information may be retrieved for a defined period (e.g. this year, last month, since registration with the system) or on a per-transaction basis. The system can use this data to provide savings information for individual transactions or over defined periods of time.

Proceeding to block 456, the reporting module 308 receives configuration data that defines the metrics to display for the customer. The configuration data may be stored in the data storage area 108 linked to the customer's account, or the configuration data may be received from the customer when they select the metrics to display at the time the report is prepared. The configuration data may also include the time period for which savings should be calculated (e.g. year to date, previous month, etc.).

Proceeding to block 458, the environmental savings calculation module 314 calculates the consumer's environmental savings using the time periods and metrics specified by the configuration data. The calculation depends on the type of fuel the customer uses and the metric that is being calculated. For example, over the selected time period a customer may use V gallons of B99 biodiesel, which is a blend of fuels containing 99% biodiesel and 1% petro-diesel. If the customer requests the system to provide the savings of carbon dioxide relative to petro-diesel, the savings may be calculated according to the following formula (1):

$$\text{Savings}_1 = 0.7767 \times (V \times 22.384) \tag{1}$$

The formula is derived from the fact that burning petro-diesel produces 22.384 lbs of carbon dioxide per gallon and that B99 biodiesel has been determined to reduce carbon dioxide emissions by 77.67% compared to petro-diesel. The calculation changes if the customer uses $V_1$ gallons of B99 biodiesel and $V_2$ gallons of B20 biodiesel, which contains 20% biodiesel and 80% petro-diesel. The savings may then be calculated according to the following formula (2):

$$\text{Savings}_2 = 0.7767 \times (V_1 \times 22.384) + 0.1568 \times (V_2 \times 22.384) \tag{2}$$

because B20 biodiesel has been determined to reduce carbon dioxide emissions by 15.68% compared to petro-diesel. Savings based on other metrics can be calculated similarly. Savings for other alternative fuels may also be calculated similarly, except that actual savings will vary. In some embodiments the customer may select the metric on which to perform the environmental savings, while in some embodiments the metric may be selected by the system operator.

After the savings have been calculated, processing proceeds to block 460, where the reporting module 308 displays the calculated savings to the customer. As discussed above, the system can display the environmental savings through a number of systems, including by web page, network-connected application, fuel terminal, or hard copy. If the savings are displayed with an interactive system, the customer may also change the metrics used to portray the savings.

The reporting module may also provide a community page, which is accessible through the community report link 210 on the representative reporting interface. The community page provides the same environmental savings information provided for an individual, but instead the system combines the savings generated by all of the members of a community. In some embodiments, the community is defined based on geography, so that the community page shows the savings generated by customers in a particular neighborhood, zip code, or political division. The community page may also allow the customer to become part of communities defined by workplace (e.g., employer, division, team) or by affinity, such as club membership, charitable interests, friends, or families.

Figure 5:
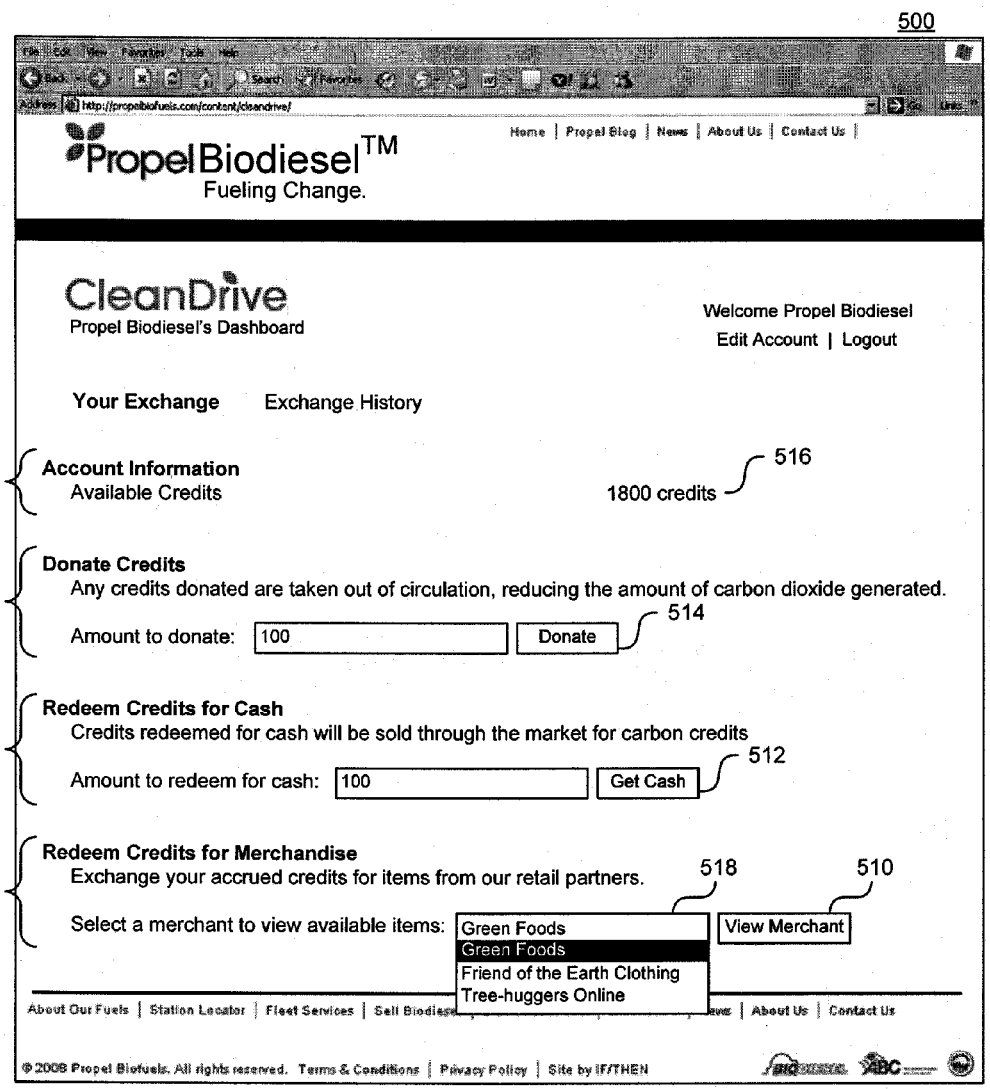
FIG. 5 is a representative interface supporting exchange of environmental savings.

FIG. 5 shows a representative interface supporting exchange of environmental offsets. The interface allows customers to receive value in exchange for their accumulated environmental savings. In an account information section 502, the interface provides the customer with current account information, such as the amount of credits 516 the customer has available to redeem. The available credits are calculated as described below based on the customer's alternative fuel purchases. The account information section 502 could include a variety of other information, as well, including the number of credits previously redeemed, the dates covered by the calculation, and a listing of the transactions through which the credits were accumulated.

The interface includes additional sections which enable the customer to exchange the accumulated credits. Specifically, the interface includes a donation section 504, which allows the customer to donate the accumulated credits. Credits which are donated are taken out of circulation. This has the effect of making the remaining credits more expensive, creating a greater incentive to polluters to reduce their own emissions. As shown in FIG. 5, the customer can donate the credits by entering a number of credits to donate and selecting the button 514.

The interface also includes a cash exchange section 506, which allows the customer to exchange the accumulated credits 516 for cash. As discussed above, some organizations allow the purchase and sale of various environmental savings, such as carbon offsets. Through the interface in FIG. 5, the system allows the customer to participate in that market. If the accumulated savings are certified by an organization providing offsets, the customer can redeem the credits for the value provided by the organization. To do so, the customer enters the amount of credits to redeem and selects the button 512. The interface may also provide a calculation function that allows the consumer to determine the value of the credits to be redeemed before the credits are finally redeemed. That is, the system may calculate and display a cash value of the credits in accordance with current market pricing.

Finally, the interface includes a product exchange section 508, which allows the customer to exchange accumulated credits for products or services from other merchants. The merchants may participate in the exchange service in order to show their environmental credentials or to develop a relationship with the system's customers. The interface provides a drop-down menu 518 that allows the customer to view a merchant's products or services. The customer then selects the view button 510 to view the available products or services that are available for exchange. Participating merchants may customize stores to serve customers that come by way of the exchange. The stores may, for example, price all items in terms of the credits, rather than by cash value.

Figure 6:
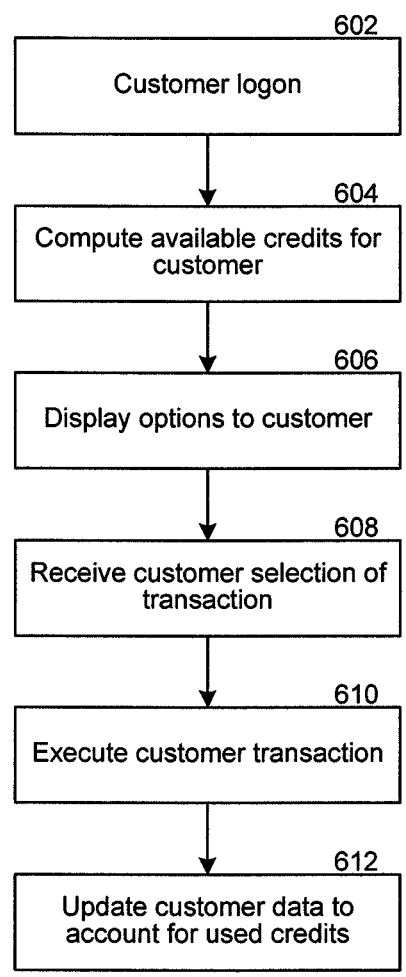
FIG. 6 is a flow chart of a process implemented by the system for exchanging environmental savings.

FIG. 6 is a flow chart of a process 600 implemented by the system for exchanging environmental savings. At block 602, the customer logs on to the system. After the customer has logged on, processing proceeds to block 604 when the customer chooses to enter the exchange section of the system. When the customer begins the exchange process, the trading management module 310 may retrieve the customer's exchange preferences from the data storage area. The preferences may include default value or configuration choices. At block 604, the trading management module 310 calculates the customer's available credits. In some embodiments, the trading management module 310 interacts with the environmental savings calculation module 314 to determine the value of the savings the customer has accrued. The system may calculate credits based on a preset standard exchange rate, or it may dynamically adjust the exchange based on current market conditions. For example, the system may use the current value of the carbon offsets in a carbon market to calculate the available credits. In calculating the credits, the trading management module 310 subtracts credits that have previously been redeemed.

Proceeding to block 606, the trading management module 310 displays the available options to the customer. The trading management module 310 provides the available options to the user interface (web page, mobile application, or terminal) for display. As described above with reference to FIG. 5, the options could include, for example, retiring the credits, exchanging the credits money, or exchanging the credits for products or services.

Proceeding to block 608, the trading management module 310 receives the customer's selection of an exchange that the customer would like to make. The customer's selection includes both the action to take and the value of credits to apply to that action. For example, if the customer opts to retire the credits, the trading management module 310 will also receive from the customer the number of credits to be retired.

Proceeding to block 610, the trading management module 310 executes the selected exchange. In order to execute the exchange, the system may communicate with one or more external systems to retire the credits, add the cash value of the credits to the customer's account, or place the customer's order for products or services.

Finally, processing proceeds to block 612, where the trading management module 310 updates customer data to account for credits used in the exchange. After the exchange is executed, the trading management module 310 updates the data storage area 108 to decrement the credits available for future exchanges. The system may also store data about the exchange that was executed by the customer in the data storage area. The system could use the stored exchange data to display a listing of historical exchanges to the customer.

It will be appreciated that the environmental savings reporting and exchange system could be varied in a number of ways. For example, the reporting interface could give the customer the ability to exclude certain transactions from the offset calculation. The reporting function could also be extended to provide graphs showing trends to the consumer. For example, the system could allow the consumer to view the changes in environmental savings from month to month or year to year. The system could also sell additional services that could enable customers to further reduce their environmental impact. For example, the system could sell additional carbon offsets to enable customers to further reduce the carbon footprint of their fuel use.

As noted above, the system may allow the customer to track multiple vehicles in a single account. If the customer has multiple vehicles on the account, the data collector may prompt the customer to select which vehicle is being fueled at the time. The reporting system can then allow the customer to see the savings per vehicle rather than having to view all vehicles in aggregate.

The system can also be configured to allow a single customer to track the savings generated by a number of drivers. For example, a company may provide alternative fuel vehicles to its employees for work purposes. In such a case, the system could store all fuel purchases by employees under the company's account. The company would thus have an effective way to track the benefits of using alternative fuels. The company could also benefit from the marketplace in the same way as an individual customer, donating the credits or exchanging them for money. Each employee may also be required to enter a particular employee code when purchasing using the company's account, thereby allowing the company to track savings on a per-employee basis.

Although the system is primarily used for tracking automobile fuel use, it could also be used in other contexts where alternative fuels are used. For example, the system could be used to track the environmental savings generated when a customer switches to using alternative fuels to heat a home or business.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method performed by a computing system to enable consumers to exchange environmental savings generated by using alternative fuel, the computer system including a processor and a storage area, the method comprising:
   receiving, at the computing system, transaction information on purchases of alternative fuel by a customer at one or more fueling stations, the transaction information automatically received as a result of the customer's purchases at the one or more fueling stations;
   converting, by the computing system, the received transaction information to credits reflecting environmental savings;
   presenting, by the computing system, the customer with an indication of the credits associated with the purchases made by customer at the one or more fueling stations and multiple redemption options for which the credits can be redeemed;
   receiving from the customer, at the computing system, a first amount of credits to be redeemed in accordance with a first redemption option of the multiple redemption options and a second amount of credits to be redeemed in accordance with a second redemption option of the multiple redemption options; and
   causing the received first amount of credits to be redeemed in accordance with the first redemption option and the received second amount of credits to be redeemed in accordance with the second redemption option.

2. The method of claim 1, wherein the redemption option is to exchange the credits for money.

3. The method of claim 1, wherein the redemption option is to donate the credits.

4. The method of claim 1, wherein the redemption option is to retire the credits.

5. The method of claim 1, wherein the redemption option is to exchange the credits for products or services.

6. The method of claim 1, further comprising displaying to the customer a plurality of merchants whose goods or services can be exchanged for the credits.

7. The method of claim 1, further comprising displaying to the customer a history of previous redemptions.

8. The method of claim 1, wherein converting the received transaction to credits reflecting environmental savings comprises calculating a market value of the environmental savings.

9. A system for exchanging environmental savings generated by using alternative fuel, comprising:
   a memory storing computer-executable instructions of:
      a data receiver component configured to receive transaction information on purchases of alternative fuel by a customer at one or more fueling station, the transaction information automatically received as a result of the customer's purchases at the one or more fueling stations;

a data conversion component configured to convert the received transaction information to credits reflecting environmental savings;

a display component configured to present the customer with an indication of the credits associated with purchases made by the customer at one or more fueling stations and multiple redemption options for which the credits can be redeemed; and a redemption component configured to:
   receive from the customer a first amount of credits to be redeemed in accordance with a first redemption option of the multiple redemption options and a second amount of credits to be redeemed in accordance with a second redemption option of the multiple redemption options; and
   cause the received first amount of credits to be redeemed in accordance with the first redemption option and the received second amount of credits to be redeemed in accordance with the second redemption option; and a processor for executing the computer-executable instructions stored in the memory.

10. The system of claim 9, wherein the redemption option is to exchange the credits for money.

11. The system of claim 9, wherein the redemption option is to donate the credits.

12. The system of claim 9, wherein the redemption option is to retire the credits.

13. The system of claim 9, wherein the redemption option is to exchange the credits for products or services.

14. The system of claim 13, wherein the display component further displays to the customer a plurality of merchants whose goods or services can be exchanged for the credits.

15. The system of claim 9, wherein the redemption component stores a history of previous redemptions and the display component further displays to the customer the history of previous redemptions.

16. The system of claim 9, wherein converting the received transaction information to credits reflecting environmental savings comprises calculating a market value of the environmental savings.

17. A non-transitory computer-readable medium containing instructions for controlling a computer system to enable consumers to exchange environmental savings generated by using alternative fuel, by a method comprising:
   receiving transaction information on purchases of alternative fuel by a customer at one or more fueling stations, the transaction information automatically received as a result of the customer's purchases at the one or more fueling stations;
   converting the received transaction information to credits reflecting environmental savings;
   presenting the customer with an indication of the credits associated with the purchases made by customer at the one or more fueling stations and multiple redemption options for which the credits can be redeemed;
   receiving from the customer a first amount of credits to be redeemed in accordance with a first redemption option of the multiple redemption options and a second amount of credits to be redeemed in accordance with a second redemption option of the multiple redemption options; and
   causing the received first amount of credits to be redeemed in accordance with the first redemption option and the received second amount of credits to be redeemed in accordance with the second redemption option.

18. The computer-readable medium of claim 17, wherein the redemption option includes at least one of exchanging the credits for money, donating the credits, retiring the credits, and exchanging the credits for products and services.

19. The computer-readable medium of claim 17, wherein converting the received transaction to credits reflecting environmental savings comprises calculating a market value of the environmental savings.

* * * * *